No. 661,774. Patented Nov. 13, 1900.
P. J. SHEEHY & R. E. O'NEILL.
PROSPECTING SHOVEL.
(Application filed May 3, 1900.)
(No Model.)
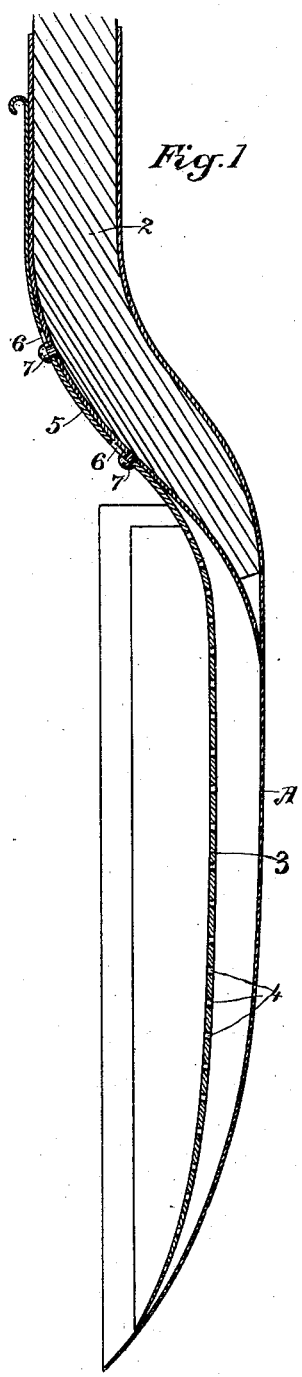
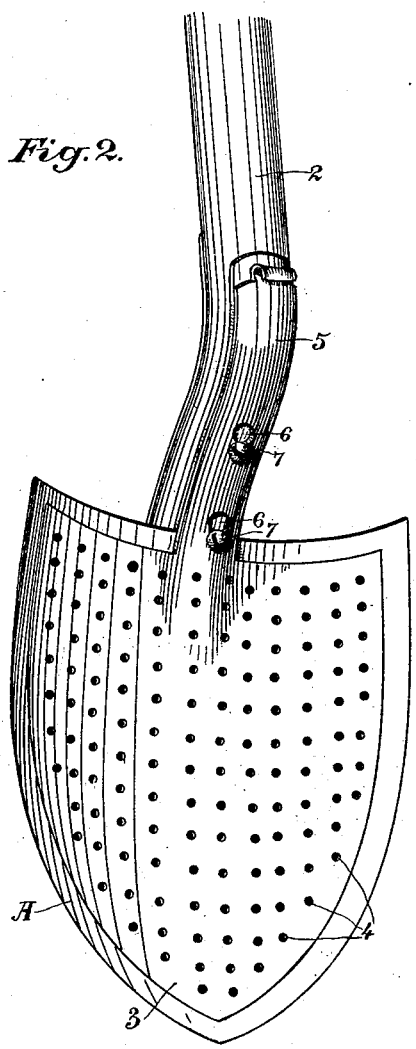

UNITED STATES PATENT OFFICE.

PATRICK J. SHEEHY AND ROBERT E. O'NEILL, OF SAN FRANCISCO, CALIFORNIA.

PROSPECTING-SHOVEL.

SPECIFICATION forming part of Letters Patent No. 661,774, dated November 13, 1900.

Application filed May 3, 1900. Serial No. 15,297. (No model.)

*To all whom it may concern:*

Be it known that we, PATRICK J. SHEEHY and ROBERT E. O'NEILL, citizens of the United States, residing in the city and county of San Francisco, State of California, have invented an Improvement in Prospecting-Shovels; and we hereby declare the following to be a full, clear, and exact description of the same.

Our invention relates to a device for rapidly and conveniently prospecting sand and other gold-bearing material and separating the larger portion of the worthless material, so as to determine whether there is sufficient indication of value to continue with the work; and it is especially designed for use in the beds of streams or in other places where the surface is under water and not easy to reach.

It consists, essentially, of a concavo-convex shovel or equivalent surface having a long handle and in connection therewith of a perforated surface of less concavity fitting over the lower surface, so that the material may be shoveled up and agitated beneath the surface of the water until the lighter material is washed away and the heavier settled through the perforations into the chamber beneath. The upper surface is readily detachable, so that the concentrated material below can be examined and it can be determined whether there is any gold or valuable material contained therein.

Referring to the accompanying drawings, Figure 1 is a vertical central section through the shovel. Fig. 2 is a face view of the same.

In many places it is difficult to prospect the sand or gravel which may possibly contain gold by reason of its being submerged beneath a body of water, and in any case it is desirable to work over a certain amount of material as rapidly as possible while prospecting to determine whether it is desirable to proceed further in the work. For this purpose we employ a shovel or equivalent surface A, having a handle 2 of considerable length. For convenience the ordinary long-handled shovel may be employed, having the upper surface concaved and of any sufficient or desirable depth. If desired, the shovel may be stamped out and made with a greater concavity than that usually employed for an ordinary shovel.

3 is a metal plate shaped similarly to the blade of the shovel, but of rather smaller size. This plate has numerous perforations 4 made through it. The plate is made of less concavity than the bowl of the shovel, so that while its edges rest closely upon the surface of the shovel the central portion beneath the perforations forms a chamber, into which material may pass through these perforations. Various devices may be employed to secure this plate so that it can be easily put on or detached. In the present case we have shown a shank 5, shaped similarly to the socket of the shovel-blade, and this shank has slotted openings 6 made through it.

In the socket-piece or handle of the shovel are fixed screws, rivets, or pins 7 of any description, having heads which are adapted to pass through the holes in the shank and interlock, so as to retain the upper plate firmly in place upon the shovel-blade. It will be understood that this plate may be made either by stamping it and the shank out in one piece, or the blade may be made separately and the shank formed of scrap or other suitable material and welded, riveted, or otherwise secured. The slots through which the holding-pins pass are made in the form of a keyhole having one end large enough to allow the heads of the pins to pass through, and the shank can then be slipped back or forward, so as to interlock the heads with the narrower part of the slot, thus holding it firmly in place. The shank is preferably made elastic and of such a shape that the spring holds the plate 3 close against the shovel. Any suitable handle or protuberance may be formed upon this shank to allow the operator to easily remove or replace it. The plate being in place upon the shovel will thus form a chamber beneath the perforated portion, this chamber having a depth depending on the difference in concavity of the shovel-blade and plate.

The operation will then be to simply take up as much sand or other material as is desirable to work at one operation, and the blade being submerged beneath the water can be oscillated or shaken by means of its handle until a great portion of the lighter material is washed away, while the gold or any heavier material will settle through the perforations into the chamber or basin beneath the plate. When this has proceeded sufficiently, the plate may be disengaged and lifted from the shovel-blade, and a short examination will determine whether there is any gold or material of value in it. This can be repeated as often as is desirable either with material which is submerged beneath the water or by material which can be taken from a bank and afterward submerged.

Having thus described our invention, what we claim as new, and desire to secure by Letters Patent, is—

1. The combination with a shovel having a concave bowl, of a perforated concave plate within the shovel-bowl, said plate being shaped substantially like the bowl and having its edges forming a close joint around the inner surface of the bowl, the bowl and plate having different concavities whereby a chamber is formed between the two, and means for detachably securing the plate to the shovel.

2. The combination with a shovel having a handle and a concave bowl, of a perforated plate within the bowl, said plate being shaped substantially like the bowl but of less concavity and forming a chamber between itself and the bowl, and said plate having its edges forming a close joint around the inner wall of the bowl and having a shank extending along the shovel-handle, and means for detachably securing the shank to the shovel-handle.

3. A shovel having a concave bowl and a perforated plate supported within the bowl out of contact with the bottom thereof to form an intermediate chamber, and means for detachably securing the plate to the shovel.

4. The combination with a shovel having a handle and a concave bowl, of a perforated plate within said bowl and having a less concavity than the bowl, and having its edges fitting the inner surface of the bowl, and forming a chamber between itself and the bowl, a shank extending from the plate along the handle of the shovel and having keyhole-shaped slots made therein, pins fixed in the shovel-handle, having heads adapted to pass through the larger portion of the slots and to be interlocked with the narrower portion by sliding the shank with relation to the pins, and means by which the shank may be thus moved to engage with or disengage from said pins.

5. The combination with a shovel having a handle and a concave bowl, of a perforated plate of less concavity than the bowl, and having its edges forming a close joint around the inner surface of said bowl, to form a chamber between the two, and means for removably locking the plate to the shovel consisting of an elastic shank on the plate and having keyhole-slots, and pins fixed in the shovel-handle and having heads which engage with the slots when the shank is pressed down upon them.

In witness whereof we have hereunto set our hands.

PATRICK J. SHEEHY.
    ROBERT E. O'NEILL.

Witnesses:
 G. C. RICHARDS,
 N. E. W. SMITH.